US008430346B2

(12) United States Patent
Michael

(10) Patent No.: US 8,430,346 B2
(45) Date of Patent: Apr. 30, 2013

(54) COMPRESSED AIR THROTTLE DEVICE AND A POWDER SPRAY COATING DEVICE

(76) Inventor: Hanspeter Michael, Gossau (CH)

( * ) Notice: Subject to any disclaimer, the term of this patent is extended or adjusted under 35 U.S.C. 154(b) by 524 days.

(21) Appl. No.: 11/816,591

(22) PCT Filed: Feb. 16, 2006

(86) PCT No.: PCT/IB2006/000314

§ 371 (c)(1),
(2), (4) Date: Jun. 3, 2008

(87) PCT Pub. No.: WO2006/087625

PCT Pub. Date: Aug. 24, 2006

(65) Prior Publication Data

US 2009/0121051 A1 May 14, 2009

(30) Foreign Application Priority Data

Feb. 17, 2005 (DE) ......................... 10 2005 007 242

(51) Int. Cl.
*B05B 5/00* (2006.01)
*F16K 31/02* (2006.01)
*F16K 11/02* (2006.01)
*E03B 7/07* (2006.01)

(52) U.S. Cl.
USPC ........... 239/690; 239/705; 239/706; 239/407; 251/129.01; 137/556; 137/554; 137/625.13

(58) Field of Classification Search .................. 239/690, 239/706, 407, 705; 251/129.01, 129.02, 251/129.04, 129.08, 120, 121, 122; 137/556, 137/554, 625.12, 625.13
See application file for complete search history.

(56) References Cited

U.S. PATENT DOCUMENTS

| | | | | | |
|---|---|---|---|---|---|
| 1,644,171 | A | * | 10/1927 | Caldwell | 137/554 |
| 1,684,603 | A | * | 9/1928 | Stephenson | 251/89 |
| 3,335,756 | A | * | 8/1967 | Mcpherson | 137/628 |
| 3,620,185 | A | * | 11/1971 | Keller et al. | 16/277 |
| 4,195,662 | A | * | 4/1980 | Gottel | 137/554 |
| 4,406,303 | A | * | 9/1983 | Kilmoyer | 137/554 |
| 4,941,778 | A | * | 7/1990 | Lehmann | 406/28 |
| 5,080,133 | A | * | 1/1992 | Johnson et al. | 137/625.12 |
| 5,364,066 | A | * | 11/1994 | Dorste et al. | 251/122 |
| 5,647,543 | A | * | 7/1997 | Ma | 239/706 |
| 5,762,098 | A | * | 6/1998 | Manzone et al. | 137/312 |

(Continued)

FOREIGN PATENT DOCUMENTS

| | | | |
|---|---|---|---|
| EP | 1 156 882 | A | 11/2001 |
| JP | 59-181379 | U | 12/1984 |
| JP | 2002537999 | A | 11/2002 |

OTHER PUBLICATIONS

ISR for PCT/IB2006/00314 mailed May 30, 2006.

(Continued)

*Primary Examiner* — Len Tran
*Assistant Examiner* — Steven M Cernoch
(74) *Attorney, Agent, or Firm* — Lowe Hauptman Ham & Berner, LLP

(57) ABSTRACT

A compressed air throttle apparatus has at least one throttle valve adjusted by an electric motor, and an electric circuit fitted with contacting elements to alternatively interrupt and close the electric circuit in relation to the throttle valve settings. This throttle apparatus preferably is applicable to a compressed air path of powder spraycoating equipment.

19 Claims, 7 Drawing Sheets

U.S. PATENT DOCUMENTS

| | | | | |
|---|---|---|---|---|
| 5,765,762 | A * | 6/1998 | Lee et al. | 239/690.1 |
| 5,931,177 | A * | 8/1999 | Yonnet | 137/1 |
| 6,220,571 | B1 * | 4/2001 | Kim et al. | 251/284 |
| 6,382,521 | B1 * | 5/2002 | Haas | 239/69 |
| 6,460,787 | B1 * | 10/2002 | Hartle et al. | 239/691 |
| 6,561,480 | B1 * | 5/2003 | Komiya et al. | 251/129.12 |
| 6,589,341 | B1 * | 7/2003 | Michael | 118/308 |
| 6,598,803 | B1 * | 7/2003 | Haas et al. | 239/67 |
| 7,004,404 | B2 * | 2/2006 | Robinson | 239/296 |
| 2002/0056478 | A1 * | 5/2002 | Scholten et al. | 137/554 |

OTHER PUBLICATIONS

Notice of Reasons for Rejection for JP2007-555722 mailed Jul. 12, 2011.

* cited by examiner

COMPRESSED AIR THROTTLE DEVICE AND A POWDER SPRAY COATING DEVICE

RELATED APPLICATIONS

The present application is based on International Application No. PCT/IB2006/000314 filed Feb. 16, 2006, and claims priority from, German Application Number 10 2005 007 242.9, filed Feb. 17, 2005.

BACKGROUND

The present invention relates to a compressed air throttle apparatus in particular used for powder spraycoating equipment. Moreover the present invention relates to powder spraycoating equipment containing at least one such throttle apparatus.

Powder spraycoating equipment comprising a throttle apparatus of the above kind is known from the European patent document EP 1 156 882 B1. It comprises an electrical stepping motor which rotates a valve element by the intermediary of a bellows connection. The valve element is fitted with a thread engaging a housing thread whereby, during its rotation, said valve element is axially displaced relative to a valve seat in order to change the aperture of a throttling duct present in the valve seat. Said patent also shows a throttle apparatus having two throttle valve s configured in mutually opposite manner and being driven by the same stepping motor, as a result of which, during opening one throttle valve, the other throttle valve shall close or, vice-versa depending on the direction of rotation of said stepping motor. The stepping motor shall be rotated by a given number of steps from its reference position to a predetermined aperture of the minimum of one throttling duct.

In practice, the known throttle apparatus valve is at its minimum aperture in the reference position, said minimum aperture being at least completely closed or at most a slightly open one to a compressed air leakage flow that is measured before operating the throttle apparatus and that is taken into account when the stepping motor is electrically controlled to adjust a desired operational, compressed air flow. On account of manufacturing tolerances and the need to take into account the motor shaft angular position at the end of a rotational step, It is exceedingly difficult in practice to make use of the completely closed position of the throttle apparatus as the reference position from which the number of steps of said stepping motor shall be counted in order to allow a given airflow through the throttle apparatus valve.

FIG. 1 of the appended drawings shows a state of the art embodiment mode of spraycoating system defined in the said EP 1 156 882 B1 patent document. An electric stepping motor 2 is driven by an omitted electrical control in order to rotate by means of a bellows connector 4 a valve element 6 by a predetermined number of rotational steps for the purpose of adjusting thereby a valve needle tip 8 of the valve element 6 relative to a valve seat 10 and thus to adjust the aperture of a throttling duct 12 constituted in this valve seat 10. The valve element 6 is fitted with a thread 14 engaging a thread 16 of a housing 17, thus transforming the rotational displacement of the stepping motor 2 into an axial displacement of the valve element 6. At the minimal and preferably zero aperture of the throttling duct 12—such full closure of the throttling duct however being very difficult to attain in practice—further rotation and hence further axial displacement of the valve element 6 is stopped by stop 18 of the valve element 6 coming circumferentially to rest against a stop 20 of the housing 17. To allow opening the throttling duct 12 by more than a rotation of 360° of the valve element 6, the two stops 18 and 20 already must already be spatially apart far enough as indicated in FIG. 1 that they may be rotated past one another. This requirement entails an axially very short overlap of the two stops 18 and 20 at the minimal setting as a reference position of the aperture of the cross-sectional aperture of the throttling duct 12 and moreover a thread 14, 16 of relatively high pitch. The larger the thread pitch, the larger however the axial displacement of the valve element 6 per step of the stepping motor 2. Accordingly fine adjustment of the throttle apparatus valve 8, 10, 12 is precluded. This difficulty is compounded by the manufacturing tolerances of the particular constituents. On the other hand highly accurate adjustment of flows of compressed air through the throttling duct 12, further the ability to set minute changes in such a compressed air flow, are desirable. But the system of the state of the art already may incur an error in adjustment in that, when the two stops 18 and 20 make rotational contact, the stepping motor 2 has not yet fully carried out the rotational step required by its electrical control.

SUMMARY

The objective of the present invention is to create a way to fine-adjust the throttle apparatus in a simpler way than possible in the state of the art.

The throttle apparatus of the present invention is especially advantageous when applied to powder spraycoating equipment because therein good coating quality and good efficiency relating to the needed quantity/rate of coating powder do depend on the pertinent flows of compressed air being accurately adjustable, hence in fine steps or continuously. All these requirements are now met by the present invention.

Moreover the present invention is applicable to more than powder spraycoating equipment, namely where finely adjusted flows of compressed air or liquids are required.

DETAILED DESCRIPTION

Figure 1:
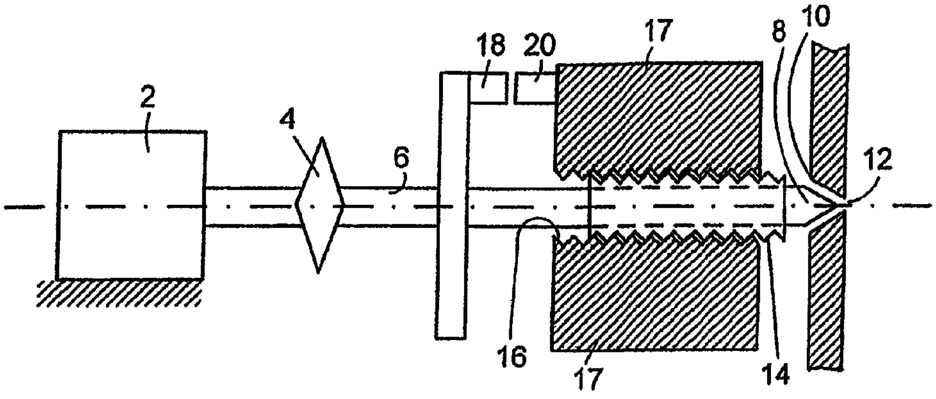
Fig. 1 Prior Art
FIG. 1 shows schematically and partly in axial section a compressed air throttle apparatus of the state of the art used in powder spraycoating equipment.
Figure 2:
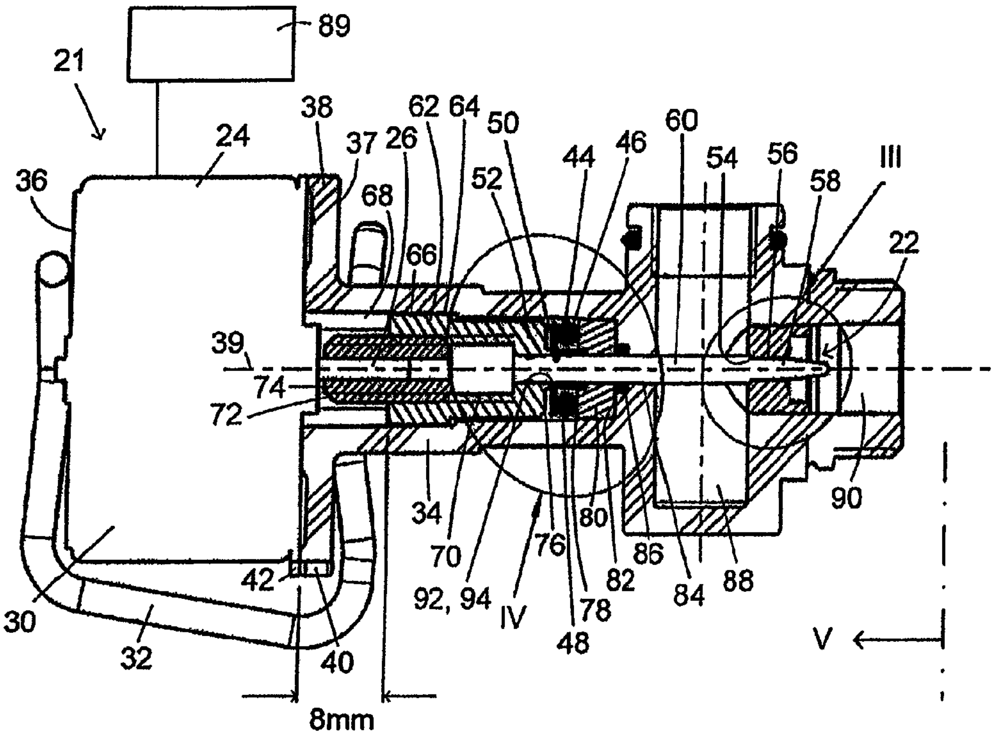
FIG. 2 shows a compressed air throttle apparatus of the present invention in axial section along the plane II-II of FIG. 5 in its partly or completely closed position which in this instance is a reference position from which to control the throttle apparatus.

The compressed air throttle apparatus 21 of the invention shown in FIGS. 2 through 9 contains a valve 22 and a controlled electric motor 24 fitted with a shaft 26 adjusting the throttle valve 22. The motor 24 may be arbitrary, its shaft 26 being rotationally driven into throttle valve 22. The motor 24 may be arbitrary, its shaft 26 being rotationally driven into defined angular positions. Preferably it shall be an electric motor. The housing 30 of the electric motor 24 is affixed by a bent resilient bar 32 to a valve case 34. The bent resilient bar 32 is stressed between a rear end face 36 of the motor housing 30 and a front end face 37 of a flange 38 of the valve case 34. To irrotationally secure the motor housing 30 on the valve case 34, said two components are linked to a plug-in connector running parallel and excentrically to the axial center line 39 of the motor 24. Said plug-in connector illustratively may be fitted with a protrusion 40 situated for instance at the valve case 34 and with a recess 42 at the other component, for instance the motor housing 30, as schematically indicated in FIG. 2. Such irrotationality also may be implemented using other means, for instance a screw between the motor housing 30 and the flange 38.

Moreover the invention provides an electrical circuit 44 fitted with at least two, illustratively three electrically conducting contacting elements 46, 48, 50 to alternatively open and close the electrical circuit 44 as a function of the setting of the throttle valve 22.

In a special embodiment of the invention, at least one of the contacting elements, for instance the contacting element 50, is mounted on an axially displaceable valve part 52 and jointly with same is displaceable by the motor 24 relative to at least one of the other contacting elements, for instance relative to the two other contacting elements 46 and 48 and thereby at the same time relative to a valve seat 54 of the throttle apparatus valve 22, for the purpose of changing the aperture of a throttle apparatus duct 56 in the valve seat 54 using the valve head 58 of a valve element, preferably a valve needle, which is a part of the adjustable valve part 52.

The valve needle 60 is linked in such manner to the motor shaft 26 that it shall be axially displaceable by rotating the motor shaft 26 without said needle 60 itself being rotated. For that purpose the valve needle 60 is guided axially in a passage 64 of the valve case 34. At least over part of its length, the passage 64 is non-circular, preferably it shall be polygonal, for instance being square/rectangular, to preclude rotating the valve needle 60. In accordance with the shown preferred embodiment mode of the drawings, a threaded bush 62 is affixed to the rear end of the valve needle 60, said bush preferably being made by injection molding and comprising a polygonal outer periphery portion 66 which is guided axially along a polygonal inner peripheral portion 68 of the passage 64. The threaded bush 62 is fitted with an inside thread 70 engaging an outside thread 72 of a second threaded bush 74 that is irrotationally affixed on the motor shaft 26.

The electrically conductive contacting elements 46, 48 and 50 of the electric circuit 44 are configured around the valve needle 60 in the passage 64 between a forward-pointing end face 76 and a rearward-pointing end face 78 of a spacer 80. The spacer 80 rests axially against a rearward-pointing end face 82 of an offset of the passage 64.

An aperture portion 84 of the passage 64 is constricted by the offset 82 and is sealed by a seal 86 relative to a first valve chamber 88. The throttle valve 22 is situated between the first valve chamber 88 and a second valve chamber 90.

In the preferred embodiment of the invention, the two immovable contacting elements 44 and 46 are configured apart from each other in stationary manner at the rearward-pointing end face 78 of the spacer 80 in a transverse plane which is perpendicular to the center line 39. The displaceable contacting element 50 is displaceable jointly with the displaceable valve part 52 and is designed as a contact shunt to shunt the two contacting elements 44, 46, as a result of which the electrical contacting elements constitute a sensor. The contacting element 50 designed as a contacting element shunt makes contact with and shunts the two stationary contacting elements 44 and 46 only when the valve needle 60 has assumed a predetermined reference position, preferably when the valve needle 60 closes the throttling duct 56 almost completely or preferably completely as shown in FIGS. 2, 3 and 4.

When the electric contacting elements 46, 48, 50 are closed, a reference signal is generated in an electric control 89 indicated only schematically, said signal corresponding to a reference setting (reference position) of the throttle valve 22, and said setting/position preferably being the completely or nearly complete closed throttle valve closed position. When this reference position is only the partly closed position of the throttle valve 22, the ensuing leakage of compressed air flowing through the throttle valve 22 can be measured. With each step of the stepping motor 24, the throttle valve 22 is opened a little more so that a slight increment of compressed air is passing through the throttle valve 22. Accordingly each rotational step constrained by the control 89 on the motor 24 relates to a predetermined and measurable quantity/rate of measurable, compressed air through the throttle valve 22. As a result a desired quantity/rate of compressed air is reproducible at any time.

The throttle valve is designed in a manner that at the beginning of a displacement opening the valve needle 60, the contacting element 50, which is also displaceable jointly with the valve needle shall be moved away from the contacting elements 46 and 48 and thereby the electrical circuit 44 shall be interrupted.

Figure 3:
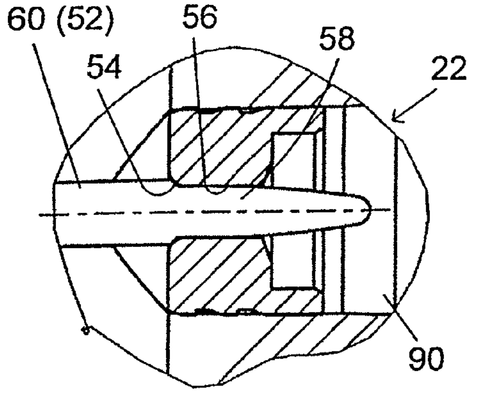
FIG. 3 is an enlarged detail III of FIG. 2.
Figure 4:
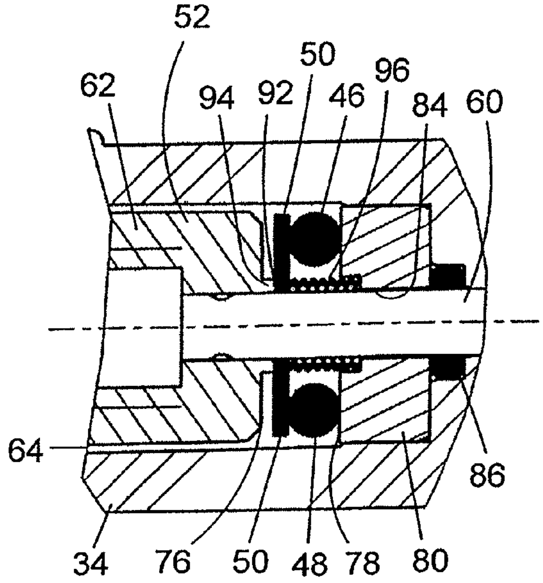
FIG. 4 is an enlarged detail IV of FIG. 2.
Figure 6:
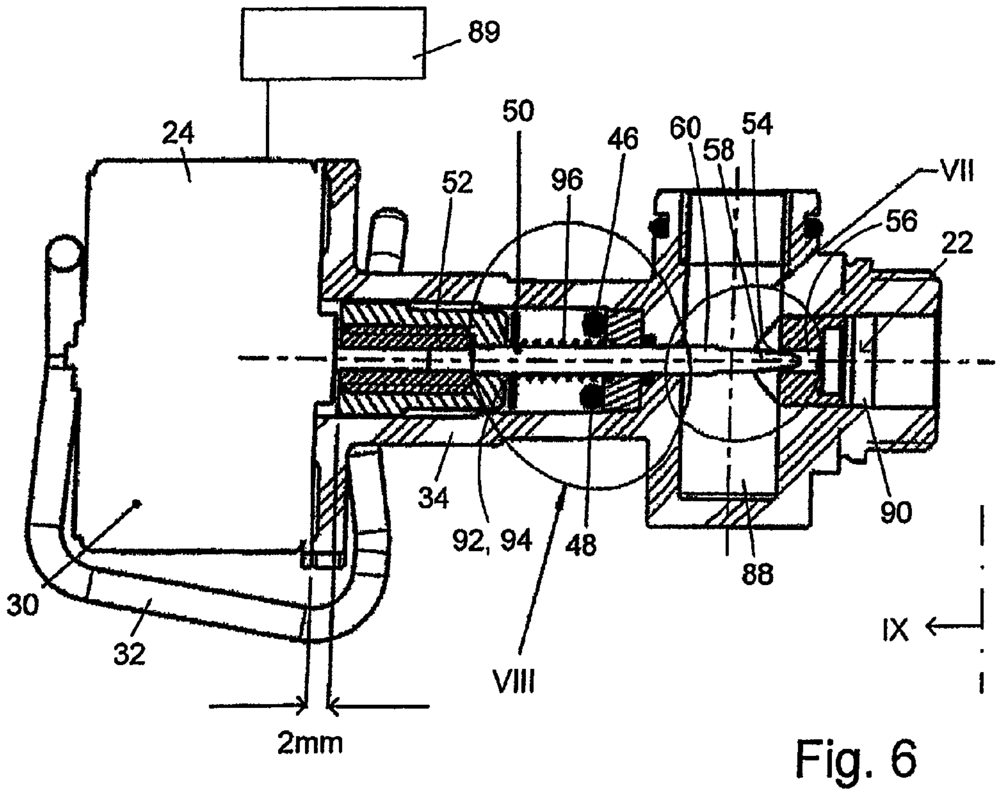
FIG. 6 is an axial section of the throttle apparatus of the present invention when the throttling element is in its wide open position.
Figure 7:
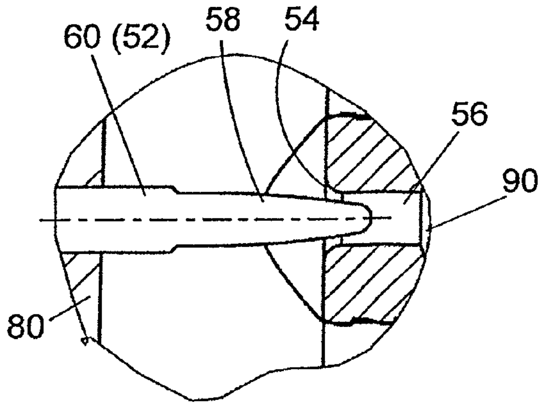
FIG. 7 is an enlarged detail VII of FIG. 6.
Figure 8:
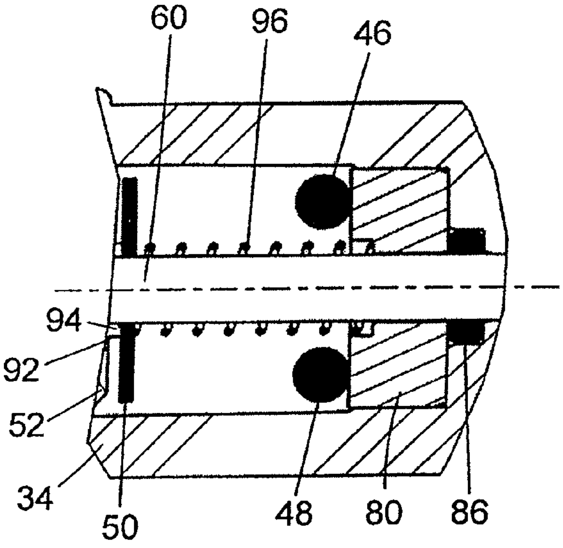
FIG. 8 is an enlarged detail VIII of FIG. 6.

As shown by FIGS. 2 and 6, the adjustable valve part 52 and hence also the valve needle 60 may be adjusted for instance by an adjustment distance of 6 mm, the axial distance between the rear end of the threaded bush 62 and the motor housing 30 for the reference position of FIGS. 2 through 4 for instance being 8 mm and for instance 2 mm in the completely open valve position shown in FIGS. 6 through 8. The electrically conductive contacting elements 46, 48, 50 make contact with one another only in the reference position of the valve needle 60 but in no other of the possible axial settings of said needle. When the contacting elements 46, 48, 50 make contact with one another, the electrical circuit 44 is closed, and it will be interrupted when said contacting elements do not touch each other.

The invention also may be implemented when the said preferred valve needle's reference position is replaced by another reference position.

Figure 5:
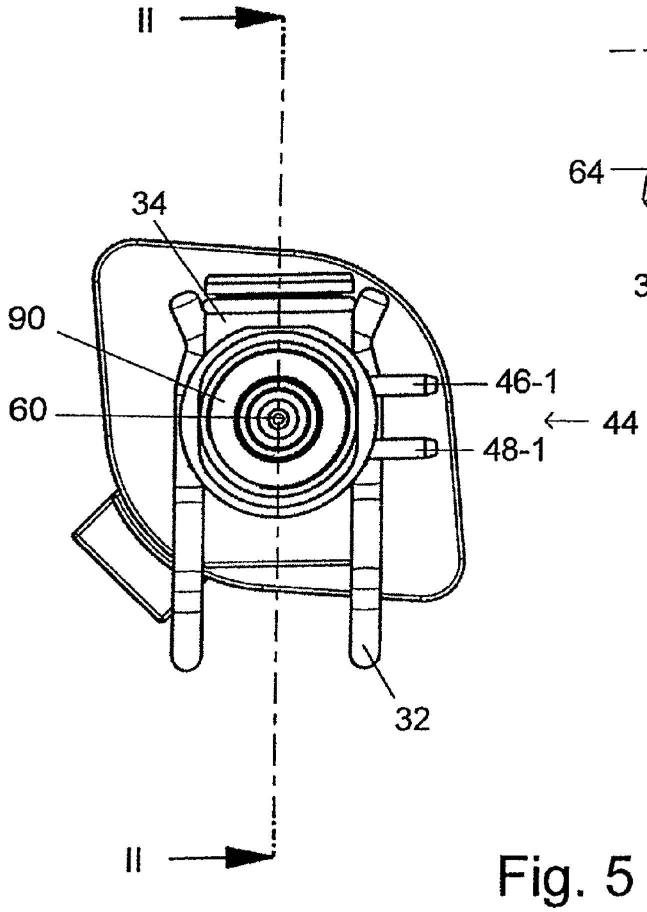
FIG. 5 is a front view of the throttle apparatus of FIG. 2 seen in the direction of an arrow V of FIG. 2.
Figure 9:
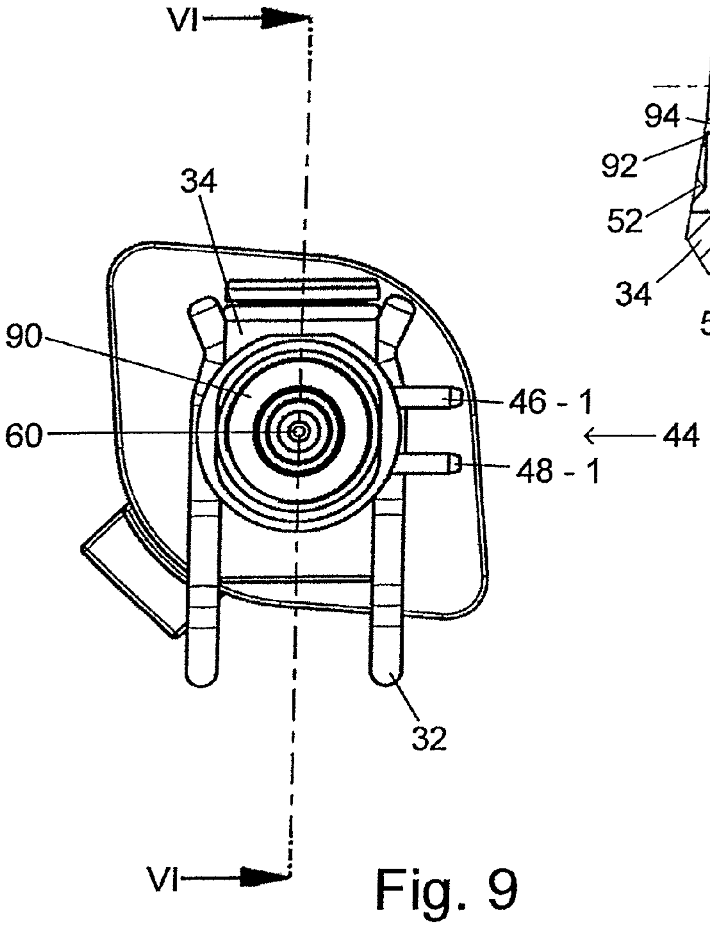
FIG. 9 is a rear view of the throttle apparatus of the present invention seen in the direction of an arrow IX of FIG. 6.

The two stationary contacting elements 44 and 46 are respectively fitted with an electrical terminal 46-1 and 48-1 shown in FIGS. 5 and 9.

The displaceable contacting element 50 is connected to the displaceable valve element 52, preferably to the valve needle 60, for the purpose of joint motion and preferably is an electrically conductive contacting annulus enclosing the valve needle 60 and is supported in tipping manner on a forward-pointing rest surface 92 which is constituted at the valve needle 60 or preferably, as indicated in the drawings, at a forward-projecting annular collar 94 of the threaded bush 62. Because the contacting annulus 50 is able to tip, it ensures it will rest not only against one, but against both stationary contacting elements 46 and 48 and connect electrically the latter to each other when contacting surfaces of these contacting elements 46 and 48 do not run parallel to the contacting annulus 50 acting as a contacting shunt.

A helical compression spring 96 is axially stressed between the displaceable contacting element 50 (contacting shunt, contacting annulus) and the spacer 80 in order to keep the contacting element 50 resting against the support surface 92 in all axial settings of the adjustable valve part 52. Moreover the compression spring 96 ensures that the teeth of the threads 70 and 72 always shall rest against each other in the same axial direction, as a result of which neither play between these teeth nor tolerances shall affect the adjustment accuracy of the throttle valve 22.

In another, omitted embodiment mode of the invention, none of the electrically conductive contacting elements is a shunting element, instead this design of the invention provides only one of the two stationary contacting elements 46 or 48, and the displaceable contacting element 50 is fitted with an (electrical) terminal connected to the electrical control 89, as a result of which a signal shall be generated in said control when the two contacting elements 50 and 46 (or, in other embodiment modes, 50 and 48) make contact with each other in the reference position shown in FIG. 2, respectively they shall be out of contact in all other positions of the valve needle 60.

Figure 10:
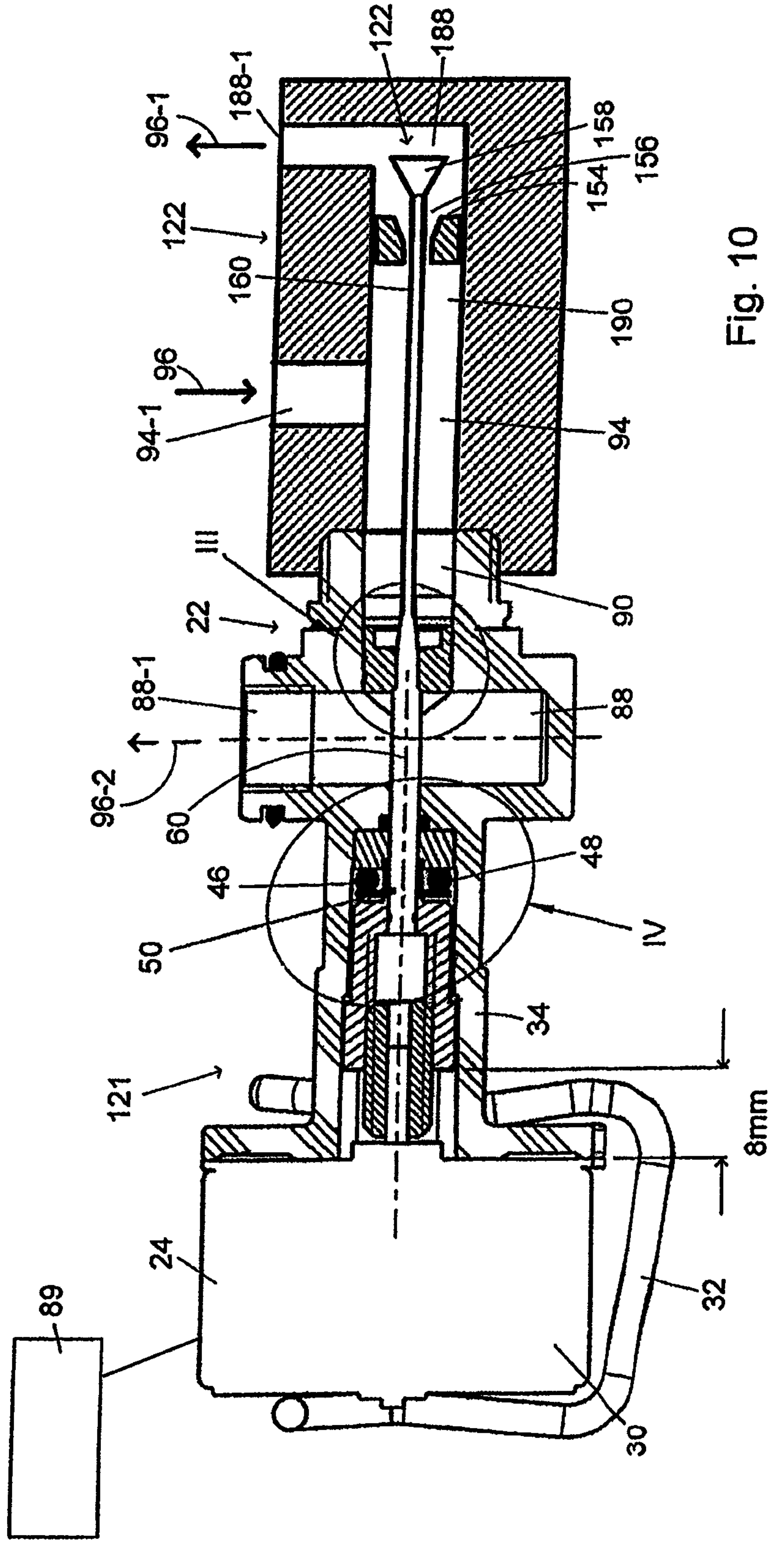
FIG. 10 is a longitudinal section of a further embodiment mode of a throttle apparatus of the present invention, similar its first embodiment mode, being in a completely or partly closed position of the described first throttle valve, this closed position being used as the reference position from which to control the throttle apparatus, where additionally to the first throttle valve and second throttle valve is also used, said second valve being displaced in a direction entailing valve opening when the first valve is moved in the opposite direction, said second valve being displaced in the opposite, namely the closing direction when the first valve is moved in the opening direction, FIG. 10 showing the first throttle valve in the closed or nearly closed position and the second throttle valve in the full or nearly full open position.
Figure 11:
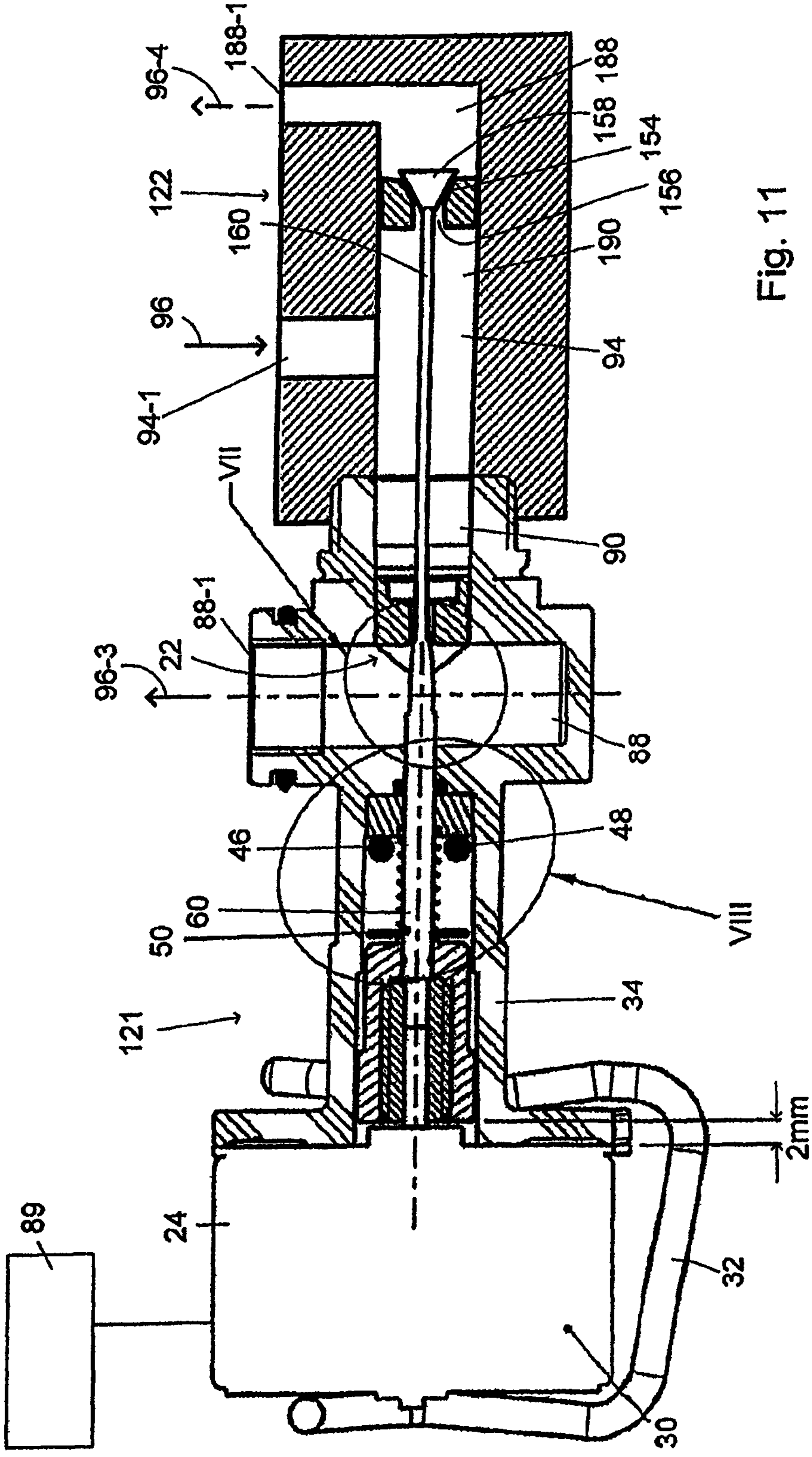
FIG. 11 shows the throttle apparatus of FIG. 10, its first valve being completely or nearly completely open and its second valve being completely or nearly completely closed, FIG. 12 schematically shows powder spraycoating equipment of the present invention which comprises a throttle apparatus of the invention as displayed in one of FIGS. 2 through 10 and inserted in at least one path of compressed air.

FIGS. 10 and 11 show another embodiment of a throttle valve 121 of the invention, wherein a second throttle valve 122 is used in addition to the first throttle valve 22 described in relation to the other Figures, these two throttle valves being mechanically linked in a manner that upon a displacement to open the throttle valve 22, the other throttle valve 122 is made to move to close, and vice-versa, when the throttle valve 22 is displaced to close, the other throttle valve 122 is displaced to open. To implement such a mechanism, and as regards the embodiment of FIGS. 10 and 11, the valve needle 160 of the second throttle valve 122 is constituted by an axial extension of the first valve needle 60. On the other hand the second valve 122 comprises a valve head 158, further a valve seat 154 configured in the opposite spatial sequence, and a throttling duct 156 passing through said valve seat 154.

The first valve chamber 88 of the first throttle valve 22 is fitted with an external compressed air port 88-1. The second valve chamber 90 of the first throttle valve 22 communicates through a valve connecting duct 94 with a second valve chamber 190 of the second throttle valve 122. The throttling duct 156 of the second throttle valve 122 is situated between this second valve chamber 190 and a first valve chamber 188 which is fitted with an external compressed air port 188-1. The valve connecting duct 94 is fitted with an external compressed air port 94-1. When the external compressed air port 94-1 of the valve connecting duct 94 is connected to a source of compressed air, compressed air 96 from said source is able to flow in relation to the settings of the throttle valve s 22 and 122 by means of the single motor 24 either only through the first throttle valve 22 or through both throttle valve s 22 and 122 or only through the second throttle valve 122, each time at defined ratio of quantity/rate as schematically indicated in FIGS. 10 and 22 by the arrows 96-1, 96-2, 96-3 and 96-4.

A preferred application of the throttle apparatus of the invention are powder spraycoating equipment because in that application the powder coating and the coating quality depend very much on accurately set flows of compressed air.

Figure 12:
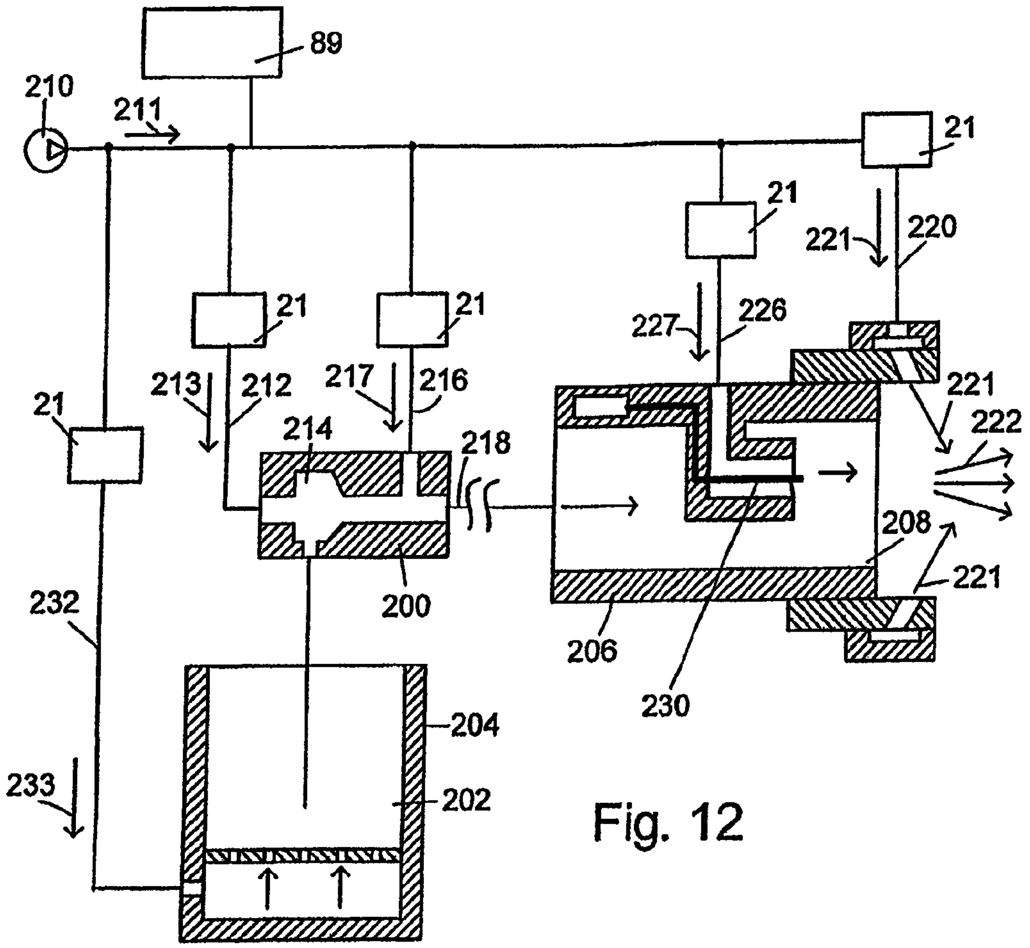

FIG. 12 schematically shows one of many applicable embodiment modes of a powder spraycoating equipment of the invention. An injector 200 sucks coating powder 202 out of a powder container 204 and moves this powder in a flow of compressed air to a sprayer 206 for instance a spray gun fitted with a spray aperture 208 or with an omitted rotary atomizer. In the present invention, a throttle apparatus 21 designed in the manner of the above disclosed invention, may be configured in at least one of the following air paths which are supplied from a pressure source 210 with compressed air 211 along an air conveyance path 212 for conveying compressed air 213 to the injector 200 to generate a partial vacuum in a partial vacuum zone 214 and thereby aspirating coating powder 202 out of the powder container 204; and/or in an additional air path 216 to supply additional compressed air 217 to the powder-air conveyance path 218 wherein the coating powder is pneumatically conveyed by the conveyance compressed air 213 to the sprayer 206; and/or in a shaping air path 220 used to apply compressed air 221 to shape a sprayed powder cloud 222; and/or in an electrode rinsing air path 226 for compressed rinsing air 227 to a high voltage electrode 230 used to electrostatically charge the coating powder in the powder flow path; and/or in a fluidizing feed path 232 for fluidizing compressed air 233 into the powder container 204 to fluidize coating powder contained therein, that is to change it into an aspirable, loose state.

Figure 13:
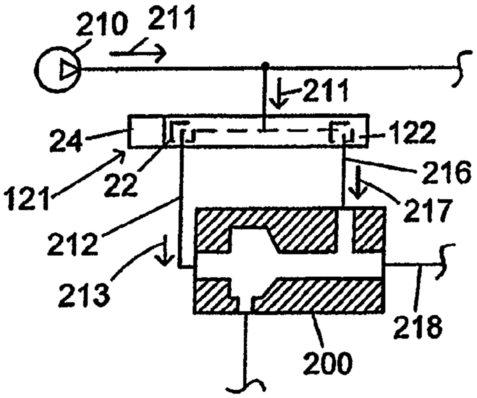
FIG. 13 shows a portion of the powder spraycoating equipment of FIG. 12, wherein the two throttle apparatus displayed in FIGS. 2 through 9 are replaced by two mutually opposite and jointly actuated throttle apparatus valves displayed in FIGS. 10 and 11.

FIG. 13 shows a detail of the powder spraycoating equipment of FIG. 12, which is devoid however of indicvival throttle apparatus 21 otherwise configured in the conveyance air path 212 and the additional air path 216 as shown in FIGS. 2 through 9, but instead the two airpaths are fitted with a single throttle apparatus 121 shown in FIGS. 10 and 11. Said single throttle apparatus 121 is shown only schematically in FIG. 13. The particular throttle valve 22 of this throttle apparatus 121 is configured in the air conveyance path 212 for conveying compressed air 213 of the injector 200. The other throttle valve 122 of the throttle apparatus 121 is configured in the additional air path 216 for the feed of additional compressed air 217 into the powder compressed air flow path 218. Preferably the throttle apparatus 121 is designed in a manner that an adjustment in conveyance air compressed air 213 will entail in the same measure (or in another predetermined relation) an adjustment of the additional compressed air 217. In this manner the rate (quantity per unit time) of powder being conveyed can be changed by adjusting the conveyance compressed air 213 and at the same time the total quantity/rate of air in the powder compressed air flow path 218 may be kept constant downstream of the injector 200. Such a design is a preferred embodiment mode which however does not exclude other embodiment of the invention. All embodiment modes of the invention share an essential feature in that a reference position of the throttle valve shall be defined by means of one or more electrical contacting elements.

In all throttle valve embodiments, the valve needle tip preferably is conical whereby, for a needle displacement in the initial aperture range of the throttle duct, the quantity/rate of compressed air flowing through this duct shall be changed only slightly, and also opening the throttle valve from the completely closed valve position into a minutely open valve position shall entail only a very slight increase in air flow.

In the preferred embodiment modes of the invention, the throttle valve when in its reference position shall be completely or nearly completely closed.

The threads 70, 72 of the bushes 62 and 74 preferably are trapezoidal.

The components adjoining the electrically conductive contacting elements are made of electrically con-conductive materials.

The invention claimed is:

1. A compressed air throttle apparatus, comprising:

an adjustable throttle valve having a stationary valve element and a displaceable valve element displaceable in an axial direction of the throttle valve relative to the stationary valve element to adjust an opening of the throttle valve;

at least one electrical circuit having an electrically conductive stationary contacting element mounted on the stationary valve element, and an electrically conductive displaceable contacting element mounted on the displaceable valve element;

a spring disposed between the displaceable contacting element and the stationary valve element, and biasing the displaceable contacting element in the axial direction against the displaceable valve element and away from the stationary contacting element;

a stepping motor for moving the displaceable valve element and the displaceable contacting element in the axial direction relative to the stationary valve element and the stationary contacting element; and an electrical control coupled to the electrical circuit for receiving a reference electrical signal from the electrical circuit indicating that the stationary and displaceable contacting elements are brought into contact, said electrical control being further coupled to the stepping motor for controlling the motor, while using the reference electrical signal as a reference setting, to adjust the opening of the throttle valve.

2. The compressed air throttle apparatus as claimed in claim 1, wherein the displaceable valve element is fitted with a thread and mounted in a non-rotational manner upon an axial center line of the throttle valve.

3. The compressed air throttle apparatus as claimed in claim 1, wherein the displaceable contacting element is an electrically conductive annulus having exposed portions on diametrically opposite sides of an axis of the throttle valve for electrical connection with the stationary contacting element.

4. The compressed air throttle apparatus as claimed in claim 3, wherein the annulus is supported on the displaceable valve element to be tiltable relative to the axial direction to reliably contact the stationary contacting element.

5. The compressed air throttle apparatus as claimed in claim 4, wherein the supporting surface of the displaceable valve element is smaller in diameter than the annulus.

6. The compressed air throttle apparatus as claimed in claim 1, further comprising a second throttle valve, the throttle valve and the second throttle valve being mechanically linked such that when the opening of the throttle valve increases, an opening of the second throttle valve decreases, and vice versa.

7. The compressed air throttle apparatus as claimed in claim 6, wherein:

the throttle valve and the second throttle valve each includes a throttle duct, the throttle duct of the throttle valve and the throttle duct of the second throttle valve being configured along a common axis in the axial direction and connected to each other by a connecting duct having a compressed air intake; and the displaceable valve element runs through the connecting duct.

8. The compressed air throttle apparatus of claim 1, wherein the displaceable contacting element is non-rotatable about an axis along the axial direction of the throttle valve.

9. The compressed air throttle apparatus as claimed in claim 1, wherein the contacting elements are brought into contact when the throttle valve is completely closed, and the electrical control is arranged to adjust the opening of the throttle valve based on the reference setting, which is indicated by the reference electrical signal as corresponding to a completely closed position of the throttle valve, in predetermined increments to whereby provide through said throttle valve a flow of compressed air at a desired quantity or rate at any time.

10. The compressed air throttle apparatus as claimed in claim 1, wherein the contacting elements are brought into contact when the throttle valve is nearly closed, the electrical control is arranged to adjust the opening of the throttle valve from the reference setting, which is indicated by the reference electrical signal as corresponding to a nearly completely closed position of the throttle valve, in predetermined increments and taking into account a measured ensuing leakage of compressed air flowing through the throttle valve at said nearly completely closed position, to whereby provide through said throttle valve a flow of compressed air at a desired quantity or rate at any time.

11. A compressed air throttle apparatus, comprising:

an adjustable throttle valve having a stationary valve element and a displaceable valve element displaceable in an axial direction of the throttle valve relative to the stationary valve element to adjust an opening of the throttle valve;

at least one electrical circuit having an electrically conductive stationary contacting element mounted on the stationary valve element, and an electrically conductive displaceable contacting element mounted on the displaceable valve element;

a stepping motor for moving the displaceable valve element and the displaceable contacting element in the axial direction relative to the stationary valve element and the stationary contacting element; and an electrical control coupled to the electrical circuit for receiving a reference electrical signal from the electrical circuit indicating that the stationary and displaceable contacting elements are brought into contact, said electrical control being further coupled to the stepping motor for controlling the motor, while using the reference electrical signal as a reference setting, to adjust the opening of the throttle valve, wherein the stationary contacting element includes two contacts mutually spaced apart, and the displaceable contacting element is a shunting element for electrically connecting the contacts of the stationary contacting element with each other.

12. The compressed air throttle apparatus as claimed in claim 11, wherein the shunting element is supported on the displaceable valve element to be tiltable relative to the axial direction to electrically connect the contacts of the stationary contacting element with each other.

13. A compressed air throttle apparatus, comprising:

an adjustable throttle valve having a stationary valve element and a displaceable valve element displaceable in an axial direction of the throttle valve relative to the stationary valve element to adjust an opening of the throttle valve;

at least one electrical circuit having an electrically conductive stationary contacting element mounted on the stationary valve element, and an electrically conductive displaceable contacting element mounted on the displaceable valve element;

a stepping motor for moving the displaceable valve element and the displaceable contacting element in the axial direction relative to the stationary valve element and the stationary contacting element; and an electrical control coupled to the electrical circuit for receiving a reference electrical signal from the electrical circuit indicating that the stationary and displaceable contacting elements are brought into contact, said electrical control being further coupled to the stepping motor for controlling the motor, while using the reference electrical signal as a reference setting, to adjust the opening of the throttle valve, wherein said circuit includes only one said stationary contacting element, and the displaceable contacting element is fitted with an electrical terminal connected to the electrical control for supplying the electrical control with the reference electrical signal when the stationary and displaceable contacting elements are brought in contact.

14. Powder spraycoating equipment, comprising:

a throttle valve having a stationary valve element and a displaceable valve element displaceable in an axial direction of the throttle valve relative to the stationary valve element to adjust an opening of the throttle valve;

at least one electrical circuit having an electrically conductive stationary contacting element mounted on the stationary valve element, and an electrically conductive displaceable contacting element mounted on the displaceable valve element;

a spring disposed between the displaceable contacting element and the stationary valve element, and biasing the displaceable contacting element in the axial direction against the displaceable valve element and away from the stationary contacting element;

a stepping motor for moving the displaceable valve element and the displaceable contacting element in the axial direction relative to the stationary valve element and the stationary contacting element;

an electrical control coupled to the electrical circuit for receiving a reference electrical signal from the electrical circuit indicating that the stationary and displaceable contacting elements are brought in contact, said electrical control being further coupled to the stepping motor for controlling the motor, while using the reference electrical signal as a reference setting, to adjust the opening of the throttle valve; and at least one air path for conveying compressed air under control of said throttle valve.

15. Powder spraycoating equipment as claimed in claim 14, wherein the displaceable valve element is fitted with a thread and mounted in a non-rotational manner upon an axial center line of the throttle valve;

said equipment further comprising:

a powder container; and an injector positioned in said at least one air path for sucking a quantity of a coating powder out of the powder container by using the conveying compressed air.

16. Powder spraycoating equipment as claimed in claim 15, further comprising a second throttle valve, the throttle valve and the second throttle valve being mechanically linked such that when the opening of the throttle valve increases, an opening of the second throttle valve decreases, and vice versa, to maintain a total quantity or rate of air flow through both said throttle valves constant despite adjustment in the opening of the throttle valve.

17. Powder spraycoating equipment as claimed in claim 14, further comprising:

a powder container;

an injector for sucking a quantity of a coating powder out of the powder container; and an electrode for electrostatically charging the quantity of coating powder;

wherein the throttle valve is configured in said at least one air path which is selected from the group consisting of: an air conveyance air path for conveying compressed air to the injector, a shaping air path for application of compressed air to a sprayed cloud of a coating powder, an electrode rinsing air path for passing compressed air to the electrode and a fluidizing feed path for feeding fluidizing compressed air into the powder container.

18. Powder spraycoating equipment as claimed in claim 14, wherein the displaceable contacting element is non-rotatable about an axis along the axial direction of the throttle valve.

19. Powder spraycoating equipment, comprising:

a throttle valve having a stationary valve element and a displaceable valve element displaceable in an axial direction of the throttle valve relative to the stationary valve element to adjust an opening of the throttle valve;

at least one electrical circuit having an electrically conductive stationary contacting element mounted on the stationary valve element, and an electrically conductive displaceable contacting element mounted on the displaceable valve element;

a stepping motor for moving the displaceable valve element and the displaceable contacting element in the axial direction relative to the stationary valve element and the stationary contacting element;

an electrical control coupled to the electrical circuit for receiving a reference electrical signal from the electrical circuit indicating that the stationary and displaceable contacting elements are brought in contact, said electrical control being further coupled to the stepping motor for controlling the motor, while using the reference electrical signal as a reference setting, to adjust the opening of the throttle valve; and at least one air path for conveying compressed air under control of said throttle valve, wherein said circuit includes only one said stationary contacting element, and the displaceable contacting element has an electrical terminal connected to the electrical control for supplying the electrical control with the reference electrical signal when the stationary and displaceable contacting elements are brought in contact.

* * * * *